(12) United States Patent
Srivastava et al.

(10) Patent No.: US 10,057,792 B2
(45) Date of Patent: *Aug. 21, 2018

(54) MONITORING AND MANAGEMENT OF LINKS IN A WIRELESS NETWORK

(71) Applicant: Time Warner Cable Enterprises LLC, St. Louis, MO (US)

(72) Inventors: Praveen C. Srivastava, Ashburn, VA (US); Sourabh Gupta, Ashburn, VA (US); Rajesh M. Gangadhar, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,383

(22) Filed: Aug. 29, 2017

(65) Prior Publication Data

US 2017/0366986 A1 Dec. 21, 2017

Related U.S. Application Data

(63) Continuation of application No. 13/837,768, filed on Mar. 15, 2013, now Pat. No. 9,775,054.

(51) Int. Cl.
*H04W 24/02* (2009.01)
*H04W 24/08* (2009.01)

(52) U.S. Cl.
CPC ............ *H04W 24/02* (2013.01); *H04W 24/08* (2013.01)

(58) Field of Classification Search
CPC ..... H04W 88/02; H04W 88/04; H04W 88/08; H04W 88/085; H04W 88/10; H04W 88/12; H04W 88/18
USPC ................................ 370/252, 253, 310–350
See application file for complete search history.

(56) References Cited

U.S. PATENT DOCUMENTS

| | | | |
|---|---|---|---|
| 8,406,768 B1 * | 3/2013 | Khanka ................. | H04L 5/0035 455/434 |
| 9,735,844 B2 * | 8/2017 | Chen ...................... | H04B 7/024 |
| 2014/0119196 A1 * | 5/2014 | Hui ........................ | H04W 24/10 370/241 |

* cited by examiner

*Primary Examiner* — Rasheed Gidado
(74) *Attorney, Agent, or Firm* — Chapin IP Law, LLC

(57) ABSTRACT

A wireless communication link can include an uplink and a downlink between a wireless access point and a computer device. The uplink supports communications from the computer device to the wireless access point. The downlink supports communications from the wireless access point to the computer device. The computer device executes a downlink monitor application to monitor events occurring on the downlink. The wireless access point or other suitable resource such as a remote management resource executes an uplink monitor application to monitor events occurring on the uplink. The uplink application and the downlink application log events using the same master clock. The remote management resource can be configured to analyze the uplink status information in view of the downlink status information to perform one or more functions such as troubleshooting, optimizing network settings, etc.

26 Claims, 10 Drawing Sheets

MONITORING AND MANAGEMENT OF LINKS IN A WIRELESS NETWORK

RELATED APPLICATIONS

This application is a continuation of earlier filed U.S. patent application Ser. No. 13/837,768 entitled "MONITORING AND MANAGEMENT OF LINKS IN A WIRELESS NETWORK,", filed on Mar. 15, 2013, the entire teachings of which are incorporated herein by this reference.

BACKGROUND

Conventional computer devices typically have the ability to perform functions such as identifying a presence of WiFi access points in a region. For example, according to current technology, to learn of WiFi access points in a region, a computer device transmits a wireless query signal. In response to the wireless signal, any of one or more WiFi network access points in the region respond with information indicating their identities. Accordingly, via the response information from the access points, the operator and respective computer can identify which, if any, WiFi networks are available in a region.

After identifying available WiFi networks, the computer device can initiate display of the identities of the different WiFi networks on a display screen. In such an instance, the user of the computer can manually select from a listing of the available WiFi networks in which to connect. A computer can be configured to connect to a particular WiFi network depending on detected wireless signal strength.

Subsequent to establishing a respective network connection, typically, the user is able to communicate with a respective network to which the access point is coupled. Via a radio frequency uplink from the computer to the wireless access point, the computer is able to transmit communications through the wireless access point to a target server in the network. Via a radio frequency downlink from the wireless access point to the computer, the computer receives communications through the wireless access point from the one or more resource in the network. In accordance with conventional applications, the wireless access point acts as a proxy to retrieve and transmit data on behalf of the computer device (e.g., a client).

From the user side at the computer device, certain analytic tools have been developed to analyze a respective wireless downlink to a computer. For example, a user can operate a so-called WiFi™ analytic tool on his or her computer to monitor parameters such as signal strength, available access points, WiFi™ channels, interference, etc., on the downlink. From the access point side, certain analytic tools have been developed to detect identities of users that establish a communication link with a respective access point.

BRIEF DESCRIPTION OF EMBODIMENTS

Conventional networks suffer from deficiencies. For example, wireless networks are prone to reliability issues such as radio frequency interference, congestion, lost communications, hacking, link failure, etc. Occurrence of any of these connectivity issues can be frustrating to a user that relies on use of one or more wireless access points to obtain access to a respective network. Accordingly, it is desirable to address the connectivity issues and optimize use of the network.

Certain embodiments herein are directed to novel ways of analyzing attributes of one or more wireless communication links. As further discussed herein, the analysis of uplinks and downlinks can be used for any suitable purpose such as to troubleshoot communication failures, adjust settings of a respective wireless network, optimize a wireless network, etc.

More specifically, a wireless network can include a wireless access point. In response to receiving a request from a computer device to establish a wireless connection with the access point, the wireless access point establishes a wireless communication link with the computer device. The wireless communication link can include an uplink and downlink between the wireless access point and a computer device. As its name suggests, the downlink supports data communications from the wireless access point to the computer device; the uplink supports data communications from the computer device to the wireless access point.

In one embodiment, at or around a time of establishing the wireless communication link, the computer device executes a downlink monitor application. As its name suggests, the downlink monitor application in the computer device monitors the downlink and produces status information associated with the downlink. The status information produced by the downlink monitor application can include detected events associated with the downlink and corresponding time information such as one or more time stamps indicating when the events are detected.

In one embodiment, an event clock used by the downlink monitor application is synchronized with a master clock in the network. As discussed herein, multiple resources such as other uplink or downlink monitor applications synchronize with the master clock to produce time information indicating when events occur.

In addition to the downlink monitor application in the computer device generating status information, embodiments herein include executing an uplink monitor application to keep track of events and time information associated with the uplink.

For example, subsequent to establishing the wireless communication link between the wireless access point and the computer device, a remote management resource (on the wireless access point side of the wireless communication link) receives notification that the wireless communication link has been established. Such a notification can indicate that an uplink has been established between the computer device and the wireless access point. In response to detecting that the wireless communication link (and/or uplink) has been established, the remote management resource executes an uplink monitor application that monitors the uplink side of the wireless communication link.

In one embodiment, as its name suggests, the uplink monitor application produces status information associated with the uplink. The status information can include events associated with the uplink and corresponding time information such as one or more time stamps indicating when the uplink events are detected. The master clock can be used as a basis to produce the timing information for the uplink status information. The uplink monitor application stores the status information associated with the uplink.

In one embodiment, the downlink monitor application and the uplink monitor application (which potentially execute in respective hardware on different sides of the wireless communication link) use the same master clock as a basis to keep track of different events with respect to the uplink and downlink between the wireless access point and the computer device. Accordingly, via use of the same master clock, and even though different applications keep track of the uplink and the downlink, different events that occur in the uplink and downlink can be correlated to each other. Because the events in the uplink and downlink are logged with respect to a same master, it is easier to correlate the different uplink and downlink events with each other.

Further embodiments herein can include analyzing the uplink status information in view of the downlink status information. Based on the analysis, embodiments herein can include adjusting configuration settings (to potentially increase optimization) of the uplink for subsequent communications between the wireless access point and the computer device.

Further embodiments herein can include analyzing the uplink status information in view of the downlink status information to troubleshoot a communication failure between the wireless access point and the computer device. Appropriate action can be taken in response to detecting a root cause of a communication failure.

Thus, the collected uplink and downlink status information can be used for a number of different reasons such as troubleshooting, optimizing communication settings, etc.

By way of a further non-limiting example, the downlink status information produced by the downlink monitor application can include any suitable information such as: i) a measurement of a received downlink RF signal strength, ii) a signal to noise measurement of the radio frequency downlink, iii) modulation and coding information associated with the downlink, iv) attributes of layer 1 communications transmitted over the downlink, v) attributes of layer 2 communications transmitted over the downlink, etc.

In yet further embodiments, the uplink status information produced by the uplink monitor application can include any suitable information such as: i) a measurement of a received uplink RF signal strength, ii) a signal to noise measurement of the radio frequency uplink, iii) modulation and coding information associated with the uplink, iv) attributes of layer 1 communications transmitted over the uplink, v) attributes of layer 2 communications transmitted over the uplink, etc.

These and other more particular embodiments are discussed below.

Note that any of the resources as discussed herein can include one or more computerized devices, clients, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical or tangible computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by a processor of a respective computer device, cause the processor or multiple processors of the system to: establish a downlink between a wireless access point and a computer device, the downlink supporting data communications from the wireless access point to the computer device; at the computer device, monitor the downlink; produce status information associated with the downlink, the status information including events associated with the downlink and corresponding time information indicating when the events are detected; and forward the status information to a remote management resource.

Yet another embodiments herein includes a method and computer readable storage medium and/or system having instructions stored thereon. The instructions, when executed by a processor of a respective computer device, cause the processor or multiple processors of the system to: receive notification of an uplink established between a computer device and a wireless access point, the uplink supporting data communications from the computer device to the wireless access point; at a management resource, monitor the uplink; produce status information associated with the uplink, the status information including events associated with the uplink and corresponding time information indicating when the events are detected; and store the status information associated with the uplink.

The ordering of the operations in each of the above examples has been presented for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for analyzing wireless communications transmitted in a wireless network. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In one non-limiting example embodiment, a wireless communication link includes a radio frequency uplink and a radio frequency downlink between a wireless access point and a computer device. The uplink supports communications from the computer device to the wireless access point. The downlink supports communications from the wireless access point to the computer device.

The computer device executes a downlink monitor application to monitor events occurring on the downlink. The wireless access point or other suitable resource such as a remote management resource executes an uplink monitor application to monitor events occurring on the uplink. To correlate collected data, the uplink application and the downlink application log events using the same master clock timing.

The remote management resource stores status information produced by the uplink monitor application and the downlink monitor application. A human analyzer (such as a technician) or a machine-based analyzer (such as a computer) can be configured to retrieve and analyze the uplink status information in view of the downlink status information to perform one or more functions such as troubleshooting, optimizing network settings, etc.

Figure 1:
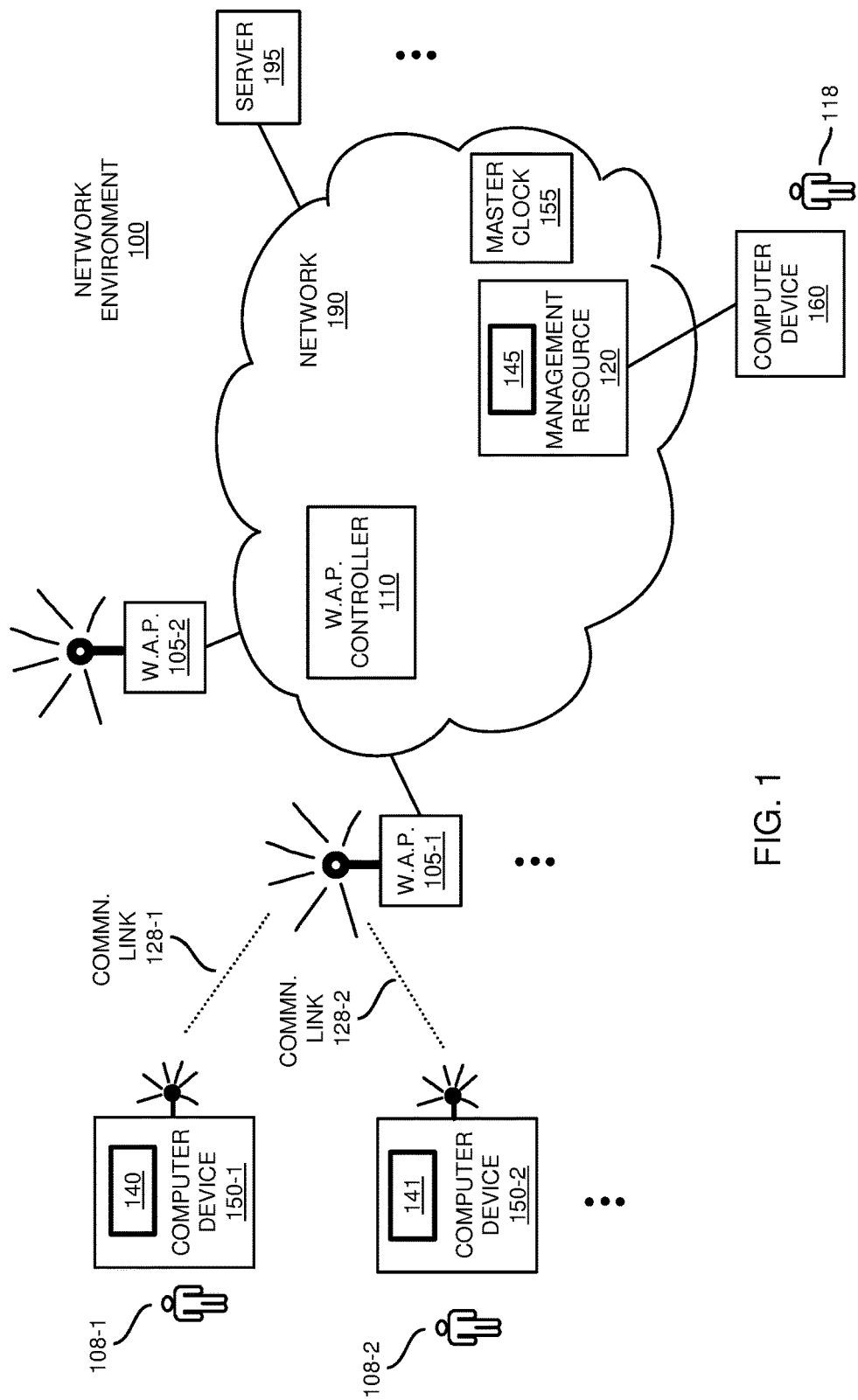
FIG. 1 is an example diagram illustrating a wireless network environment according to embodiments herein.

Now, more specifically, FIG. 1 is an example diagram illustrating a network environment according to embodiments herein.

As shown, network environment 100 includes multiple computer devices 150 (e.g., computer device 150-1, computer device 150-2, etc.), multiple wireless access points 105 (e.g., access point 105-1, access point 105-2, . . . ), and network 190. Network 190 includes wireless access point controller 110, management resource 120, master clock 155, etc. Network 190 can include any suitable resources facilitating communication amongst multiple entities.

In one embodiment, a respective user or subscriber operates each of the computer devices 150. For example, as shown, user 108-1 operates computer device 150-1; user 108-2 operates computer device 150-2; etc. Each of computer devices 150 can be stationary or mobile within network environment 100.

As a more specific example embodiment, users 108 operate computer devices 150 and communicate with access points 105 as a means to connect to a respective network such as the Internet and retrieve content. Communication links 128 can be established and support communications in accordance with any suitable type of wireless communication protocol.

Network 190 includes wireless access point controller 110. As its name suggests, wireless access point controller 110 controls one or more respective wireless access points 105 in network environment 100.

By way of a non-limiting example, the wireless access point controller 110 can be configured to control tens, hundreds, thousands, or more wireless access point 105 in network environment 190. Larger scale deployments including higher numbers of wireless access points 105 require greater resources to manage and can be quite complex.

In general, wireless access point controller 110 manages one or more control settings associated with the wireless access points 105 such as adjustment of radio frequency (wireless signal) power levels, channels, authentication, security, etc.

By further way of a non-limiting example, each of access points 105 can be WiFi™ access points or wireless base stations configured to support wireless communications such as those according to a WiFi™ protocol such as 802.11 or any other suitable wireless communication protocol.

In one embodiment, the access points 105 are open WiFi™ networks in which any of multiple public computer users can attempt to establish a network connection to obtain access to core network and a network such as the Internet.

In accordance with alternative embodiments, a user may need to be a registered subscriber in order to access and use a respective wireless access point to retrieve content.

In this example embodiment, user 108-1 operates computer device 150-1 to connect to wireless access point 105-1; user 108-2 operates computer device 150-2 to connect to wireless access point 105-2, and so on.

Via communications over wireless communication link 128-1, the computer device 150-1 and the wireless access point 105-1 communicate with each other; via communications over wireless communication link 128-2, the computer device 150-2 and the wireless access point 105-1 communicate with each other, and so on.

Subsequent to establishing a wireless communication link 128-1, via communications over wireless communication link 128-1, through network 190-1 (such as a core service provider network, Internet, etc.), the computer device 150-1 is able to retrieve content from different sources in or coupled to network 190-1 such as server resource 195.

Embodiments herein include collecting status information associated with a respective wireless communication links from multiple perspectives. For example, by way of a non-limiting example, the computer device 150-1 can be configured to execute an application and/or circuitry such as collection manager 140. Collection manager 140 at the computer device 150-1 monitors one or more attributes associated with wireless communication link 128-1 from the downstream perspective afforded by the computer device 150-1.

As shown, management resource 120 can be configured to execute an application and/or circuitry such as collection manager 145. Via collection manager 145, the management resource 120 monitors attributes associated with the wireless communication link 128-1 from the upstream perspective afforded by the wireless access point 105-2 and/or wireless access point controller 110. In one embodiment, to collect information associated with the wireless communication link 128-1, the collection manager 145 communicates with one or more resources such as wireless access point 105-1, wireless access point controller 110, etc.

Although collection manager 145 is shown as being co-located with management resource 120 (such as a server resource), note that the collection manager 145 can be configured to execute at any suitable location in network 190 such as in the wireless access point 105-1, in the wireless access point controller 110, etc.

As shown, network 190 can include a master clock 155. The master clock can be located at any suitable location in network environment 100.

In one embodiment, both the collection manager 140 and collection manager 145 synchronize with the master clock 155 and generate time stamp information to keep track of when respective events and/or attributes occur. Because the collection managers 140 and 145 synchronize and generate time stamp information based on the same master clock 155, the events (such as downlink events) associated with the wireless communication link 128-1 as detected by the collection manager 140 can be correlated with events (such as uplink events) associated with wireless communication link 128-1 as detected by the collection manager 145.

The collection managers 140 and 145 can be configured to collect any suitable type of information. For example, the collection managers 140 and 145 can be configured to collect information such as: i) measurements of a received RF signal strength on a monitored link, ii) signal to noise ratio measurements of a respective uplink or downlink, iii) modulation and coding information associated with communications on a link, iv) attributes of layer 1 communications transmitted over a respective wireless communication link, and v) attributes of layer 2 communications transmitted over a respective wireless communication link, vi) link failure events, etc. As mentioned, any of the collected information from either side of the monitored wireless communication link can be time stamped based on a master clock 155.

Network environment 100 can include network administrator 118. In one non-limiting example embodiment, network administrator 118 operates computer device 160 to control which of different types of events or attributes are to be collected by the collection managers. For example, network administrator 118 can operate computer device 160 to communicate with management resource 120. Management resource 120 can be configured to receive input such as a command from network administrator 118.

Assume in this example that the network administrator 118 generates a collection command specifying types of events to be monitored and collected by the collection manager 140. Management resource 120 receives the collection command. In response to receiving the command from network administrator 118, the management resource 120 communicates the command to the collection manager 140 executing on the computer device 140. The command can be communicated in any suitable such as via transmission over the wireless communication link 128-1 to the collection manager 140 on the computer device 150-1. In accordance with the received command, the collection manager 140 initiates collection of types of information associated with the downlink of wireless communication link 128-1 as specified by the network administrator 118.

As will be discussed in more detail later in this specification, the management resource 120 provides access to the information collected by collection managers 140 and 145. In one embodiment, the network administrator 118 initiates retrieval of the collected information for viewing. Based on an analysis of the collected information from the multiple perspectives, the network administrator 118 and/or machine-based analyzer adjust one or more settings of the wireless access points 105. Accordingly, the collected information can be used as a basis to more optimally control settings of a wireless network including one or more wireless access points 105.

Figure 2:
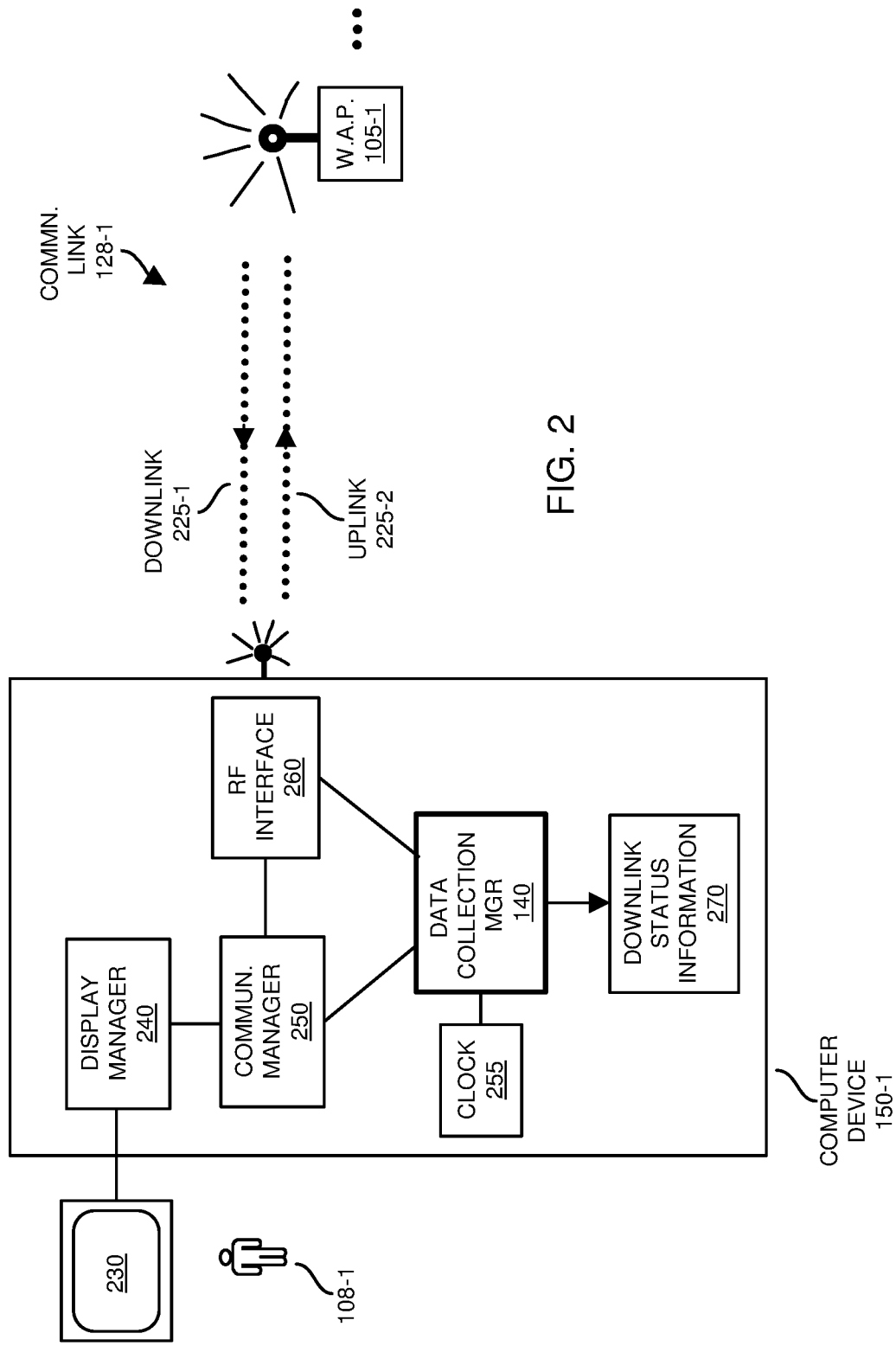
FIG. 2 is an example diagram illustrating collection of status information associated with a downlink according to embodiments herein.

FIG. 2 is an example diagram illustrating collection of information associated with a downlink according to embodiments herein.

As shown, wireless communication link 128-1 between the computer device 150-1 and the wireless access point 105-1 includes downlink 225-1 and uplink 225-2. As its name suggests, the downlink 225-1 supports wireless transmission of data communications from the wireless access point 105-1 to the computer device 150-1. As its name suggests, uplink 225-2 supports wireless transmission of data communications from the computer device 150-1 to the wireless access point 105-1.

As further shown in this non-limiting example embodiment, computer device 150-1 includes display manager 240, communication manager 250, RF interface 260, collection manager 140, clock 255, etc.

Assume that the user 108-1 operates computer device 150-1 and initiates execution of a display manager 240 such as a web browser application. Upon executing the display manager 240, the communication manager 250 communicates with RF interface 260 to open a network session. RF interface 260 initiates communicates with wireless access point 105-1 to establish the wireless communication link 128-1.

Subsequent to establishing the wireless communication link 128-1, the user 108-1 is able to generate requests for retrieval of content over network 190.

Assume in this example that the user 108-1 generates a request to retrieve a web page of content from a specified network address. The display manager 240 receives the request and forwards the request to communication manager 250. Communication manager 250 in the computer device 150-1 converts the request into a message including one or more data packets for transmission in a packet-switched network. Communication manager 250 forwards the one or more data packets to RF interface 260. RF interface initiates transmission of the received one or more data packets over wireless uplink 225-2 to wireless access point 105-1.

In one embodiment, the computer device 150-1 is assigned a unique network address. The computer device 150-1 provides the wireless access point 105-1 its corresponding unique network address (e.g., MAC address, IP address, etc.). Acting as a proxy to the computer device 150-1, the wireless access point 105-1 transmits requests and receives requested data on behalf of the computer device 150.

As a more specific example, assume that the wireless access point 105-1 receives outbound data from one or more applications executed on computer device 150-1 via communications over the uplink 225-2. The wireless access point 105-1 forwards such outbound data (e.g., requests for content or other information) to appropriate resources in network 190.

In a reverse direction, upon receiving requested data on behalf of the computer device 150-1, wireless access point 105-1 forwards data received from one or more remote resources (such as server 195-1) over the downlink 225-1 to the appropriate one or more applications executing on computer device 150-1. RF interface 260 of the computer device 150-1 receives the communications over the downlink 225-1 and forwards the communications to communication manager 250. Communication manager 250 processes the communications and forwards appropriate data portions of the communications to display manager 240.

The collection manager 140 executes on computer device 150-1. The computer device 150-1 can initiate execution of the collection manager 140 based on any suitable trigger event. For example, in one embodiment, the computer device 150-1 initiates execution of the collection manager 140 in response to detecting establishment of the wireless communication link 128-1. As a possible alternative embodiment, the collection manager 140 can persist as an application executing on the computer device 150-1.

As previously discussed, one embodiment herein includes synchronizing the clock 255 with the master clock 155 in network 190. The collection manager 140 synchronizes the clock 255 (such as a event clock) in the computer device 150-1 to a master clock 155 associated with a group of wireless access points 105. As discussed below, the collection manager 140 produces corresponding time information associated with the detected events or collected attributes information based on the clock 255.

As previously discussed, the collection manager 140 executing in the computer device 150-1 (or other suitable resource) monitors attributes of the downlink 225-1. Collection of attributes or detecting events can include communicating with one or more applications and/or resources (such as communication manager 250, display manager 240, RF interface 260, etc.) associated with computer device 150-1.

The collection manager 140 can be pre-programmed to monitor certain types of events and/or attributes.

In certain instances, a respective network administrator 118 may wish to modify which attributes and/or events are to be monitored by the collection manager 140 to aid in troubleshooting a communication failure between the content 150-1 and the wireless access point 105-1. In such an instance, the network administrator 118 can generate a command to collect a specific type of information. The management resource 120 forwards the command to the collection manager 140 over a suitable communication link.

In response to receiving a command from the remote management resource 120 to collect a specified type of data, the collection manager 140 initiates collection of status information associated with the downlink 225-1 (and/or uplink 225-2) as specified by the command. Thus, the data collected by the collection manager 140 can vary depending on which information is to be collected.

As previously discussed, the collection manager 140 can be configured to monitor any suitable type of information associated with the downlink 225-1. For example, embodiments herein can include producing status information 270 to include information such as: i) measurements of a received RF signal strength of the downlink 225-1, ii) measurements of a signal to noise ratio associated with the received downlink 225-1, iii) modulation and coding information associated with the downlink 225-1, iv) attributes of layer 1 communications such as data and/or types of communications transmitted over the downlink 225-1, and v) attributes of layer 2 communications such as data or types of communications transmitted over the downlink 225-1, vi) failure information, and so on.

By further way of a non-limiting example, in one embodiment, the downlink 225-1 is a radio frequency signal generated by the wireless access point 105-1. The wireless access point 105-1 transmits the downlink 225-1 to radio frequency interface 260 of computer device 150-1. The wireless access point 105-1 produces the radio frequency signal (such as downlink 225-1) to include data communications. The wireless access point 105-1 transmits the data communications on an allocated channel to the computer device 150-1. The RF interface 260 can be configured to produce information such as power attributes, coding information, configuration settings information, etc., associated with the downlink 225-1 and/or channel on which information is transmitted.

In one embodiment, the collection manager 140 communicates with the RF interface 260 and/or other suitable circuitry in the computer device 150-1 to retrieve the status information. The collection manager 140 then stores or records the attributes and/or events of the received downlink radio frequency signal. As mentioned, the collection manager 140 stores the information along with time stamp information to indicate when the attributes were collected or measured.

As a non-limiting example, the collection manager 140 can be configured to monitor different types of data communications received at the computer device over the downlink 225-1 radio frequency signal. The collection manager 140 stores the detected communication events as status information 270. As mentioned, the collection manager 140 can store the communication event information along with time stamp information to indicate when the communication events were collected or detected.

In one embodiment, the downlink status information 270 includes detected events and/or attributes associated with the downlink and corresponding timing information such as time stamps indicating when the respective events are detected. Accordingly, in one embodiment, the downlink status information 270 can be a log of events or attributes associated with wireless communications received from the wireless access point over downlink 225-1.

The collection manager 140 at least temporarily stores the downlink status information 270 in a repository of the computer device 150-1.

In accordance with further embodiments, the collection manager 140 forwards the status information to a remote management resource 120 in network 190. By way of a non-limiting example, in one embodiment, in response to receiving a command from the management resource 120, the collection manager 140 transmits the collected status information 270 from the computer device 150-1 over the wireless uplink 225-2 to management resource 120 in network 190.

As an alternative to transmitting the status information 270 based on a command from the management resource 120, the collection manager 140 can be configured to include a network address of the management resource 120. Further embodiments herein can include automatically transmitting the downlink status information 270 from the computer device 150-1 to the management resource 120.

Note that the status information 270 collected by the collection manager 140 is not necessarily limited to data associated with the downlink 225-1. For example, as previously discussed, the computer device 150-1 can be configured to transmit a request message over the wireless uplink 225-2 to the wireless access point 105-1. The request can specify content to retrieve and deliver to the computer device 150-1. In response to the request, the computer device 150-1 receives the requested content over the downlink 225-1. The collection manager 140 can be configured to produce the status information 270 to include information such as events associated with transmitting the request over the uplink 225-2 as well as attributes and/or events associated with receiving the content over the downlink 225-1.

Figure 3:
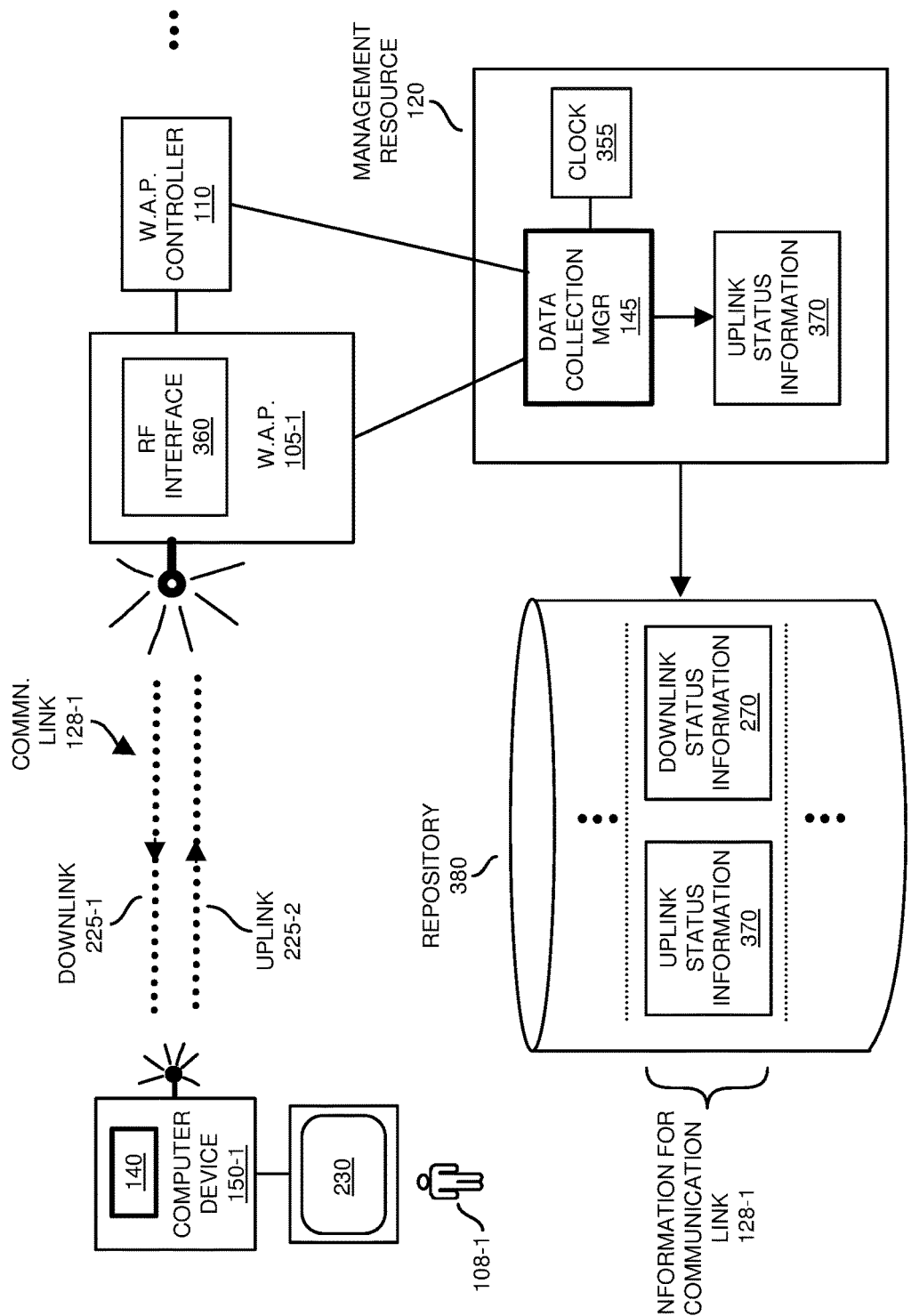
FIG. 3 is an example diagram illustrating collection of status information associated with an uplink according to embodiments herein.

FIG. 3 is an example diagram illustrating collection of status information associated with an uplink according to embodiments herein.

As shown, management resource 120 (such as an server resource) monitors wireless access point 105-1 and/or wireless access point controller 110 to detect when a new wireless communication link is established. In this example, assume that the remote management resource 120 receives notification of a wireless communication link 128-1 (and an uplink 225-2) newly established between the computer device 150-1 and the wireless access point 105-1. As previously discussed, the uplink 225-2 of the wireless communication link supports wireless data communications from the computer device 150-1 to the wireless access point 105-1.

In response to detecting establishment of a wireless communication link 128-1 (which includes the downlink 225-1 and the uplink 225-2), the management resource 120 initiates communications with the collection manager 145 to monitor the uplink 225-2.

Via the collection manager 145, the management resource 120 monitors the uplink 225-2. Based on the monitoring, the collection manager 145 produces status information 370 associated with the uplink 225-2. The status information 370 includes events associated with the uplink 225-2 and corresponding time information generated from clock 355. Clock 355 is synchronized with master clock 155. The time stamp information produced by clock 355 (or other suitable resource) indicates when the different the status information such as events and attributes are detected. The collection manager and/or management resource 120 initiates storage of the status information 370 (associated with the uplink 225-2) in repository 380.

In addition to storing the status information 370 in repository, embodiments herein include retrieving the downlink status information 270 from computer device 150-1. For example, in response to detecting establishment of a wireless communication link 128-1 (which includes the downlink 225-1 and the uplink 225-2), the management resource 120 initiates communications with the collection manager 145 to retrieve downlink status information 270 produced by the collection manager 140. As previously discussed, the collection manager 140 produces status information 270 based on monitoring the downlink 225-1. The status information 270 includes events associated with the downlink 225-1 and corresponding time information indicating when the collection manager 140 detects the events.

One way that collection manager 145 can monitor the uplink 225-2 and produce status information 370 is to transmit a message from the remote management resource 120 to wireless access point controller 105-1. In response to transmitting the message, the collection manager 145 receives attributes and/or events associated with the uplink 225-2 as detected or sensed by the wireless access point controller 110. Repeated query messages from the collection manager 145 can be used to retrieve different types of status information.

Another way that the collection manager 145 can monitor the uplink 225-2 and produce status information 370 is to transmit query messages from the remote management resource 120 to the wireless access point 105-1. In response to transmitting a message, the collection manager 145 receives attributes and/or events associated with the uplink 225-2 as detected or sensed by the wireless access point 105-1. As shown, wireless access point 105-1 includes RF interface 360 to receive the wireless uplink 225-2 signal from the computer device 150-1. RF interface 360 can include appropriate circuitry to measure and/or calculate a power parameter (e.g., signal to noise ratio, signal strength, etc.) of the radio frequency signal received on the uplink 225-2. Via the queries, the collection manager 145 retrieves event and attribute information for inclusion in the status information 370.

Accordingly, the uplink 225-2 can be or include a radio frequency wireless signal produced by the computer device 150-1 to the wireless access point 105-1. Recall that the computer device 150-1 can produce the radio frequency signal on the uplink 225-2 to include communications addressed to at least one resource in a network accessible to the wireless access point. In other words, the computer device can generate the radio frequency signal on the uplink 225-2 to retrieve requested content from a suitable resource in network 190 as previously discussed. The wireless access point 105-1 acts as a proxy on behalf of the computer device to retrieve the requested content.

In one embodiment, depending on configuration settings of the collection manager 145, the collection manager 145 monitors attributes (such as power parameters, channel settings, etc.) of the radio frequency signal received on the uplink 225-2. The collection manager 145 records the attributes of the radio frequency signal on the uplink 225-2 and a respective time at which the attributes were measured and/or obtained from one or more respective sources such as wireless access point 105-1 or wireless access point controller 110. Thus, the status information 370 includes a log of events or attributes.

Additional embodiments herein can include keeping track of data communications received or detected on the uplink 225-2. For example, the collection manager 145 can be configured to monitor the occurrence of different types of data communications received at the wireless access point 105-1 over the radio frequency signal generated by the computer device 150-1 over the uplink 225-2. The collection manager 145 records the different types of data communications and respective times at which the communications were received by the wireless access point 105-1 and/or at what time the data communications were detected.

Note that in a similar manner as discussed above for communication link 128-1, the collection manager 145 can be configured to keep track of status information for each of multiple wireless communication links. Each computer device in the network that establishes a respective wireless communication link with a wireless access point also can include a respective collection manager 141 (similar to collection manager 140 in computer device 150-1) that keeps track of a respective communication link. Management resource 120 stores respective uplink and downlink status information for each wireless communication link in repository 380.

As mentioned, the status information collected by the collection manager 140 in the computer device (such as a client) need not be limited to monitoring communications and/or attributes of the respective downlink. For example, the collection manager in a respective client (e.g., computer device) can produce the status information to include information about the data, or types of communication data, and corresponding times, indicating when the data was transmitted on the uplink. The information can further include detected attributes and/or settings of the uplink at the time of transmitting. In such an instance, an analyzer (human or machine) can utilize the information to identify what data and settings the computer device attempted to transmit on the uplink to the wireless access point 105-1. The analyzer can use the status information from collection manager 145 to identify what particular data was received at the wireless access point 105-1 in the uplink direction. Based on the comparison of information collected from the different perspectives of the communication link 128-1, the analyzer can identify whether a respective communication was successfully transmitted on the uplink from the computer device 150-1 to the wireless access point 105-1.

Additionally, the status information collected by the collection manager 145 in the computer device (such as a client) need not be limited to monitoring communications and/or attributes of the respective uplink. For example, the collection manager 145 can produce the status information to include information about the data, or types of communication data, and corresponding times, indicating when the data was transmitted on the downlink. The information can further include detected attributes and/or settings of the downlink at the time of transmitting. In such an instance, an analyzer (human or machine) can utilize the information to identify what data and settings the wireless access point 105-1 attempted to transmit on the downlink to the computer device 150-1. The analyzer can use the status information from collection manager 140 to identify what particular data was received at the computer device 150-1 in the downlink direction. Based on the comparison of information collected from the different perspectives of the communication link 128-1, the analyzer can identify whether a respective communication was successfully transmitted on the downlink from the wireless access point 105-1 to the computer device 150-1.

Figure 4:
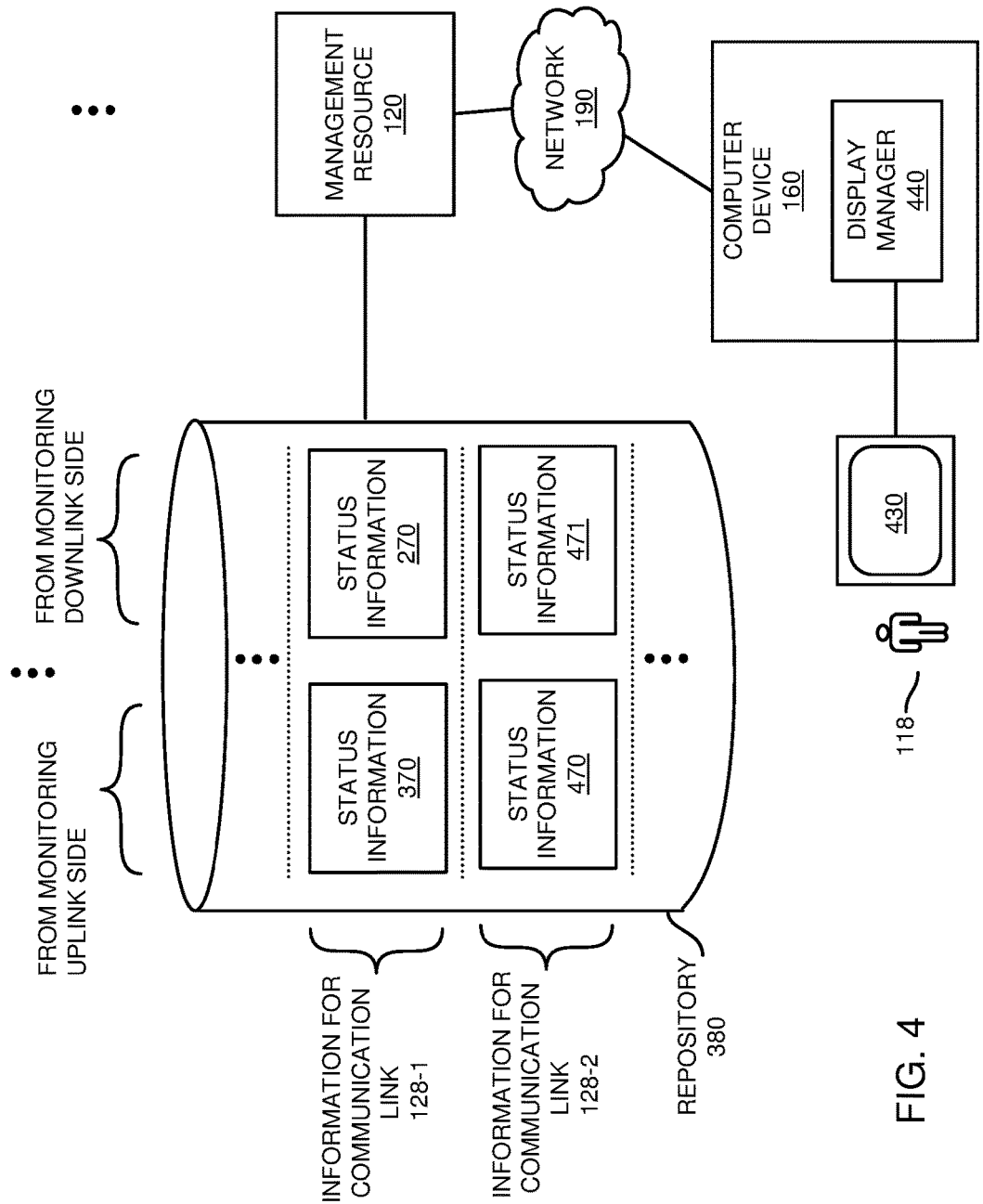
FIG. 4 is an example diagram illustrating access to stored uplink and downlink according to embodiments herein.

FIG. 4 is an example diagram illustrating access to and use of stored uplink and downlink status information according to embodiments herein.

The collection manager 140 and/or collection manager 145 can be triggered to collect status information in any suitable manner. For example, by way of a non-limiting example, the management resource 120 can be configured to initiate execution of the collection manager 140 (such as a downlink monitor application) on the computer device 150-1 in response to detecting that the wireless communication link 128-1 has been established. As an alternative, the computer device 150-1 can be configured to automatically execute a respective collection manager 140 in response to creating the wireless communication link 128-1.

Additionally, the management resource 120 can be configured to initiate execution of the collection manager 145 (such as an uplink monitor application) in response to detecting that the wireless communication link 128-1 has been established. As mentioned, the management resource 120 provides access to the status information collected by the collection manager 140 and the status information collected by the collection manager 145 as stored in the repository 380.

In this example embodiment, assume that the management resource 120 stores status information 470 and status information 471 for wireless communication link 128-2. Collection manager 141 collects status information 471 associated with wireless communication link 128-2. Collection manager 145 collects status information 471 associated with the respective wireless communication link 128-1.

Further in this example embodiment, computer device 160 provides network administrator 118 access to the information stored in repository 380. For example, computer device 160 includes display manager 440.

In one embodiment, the display manager 440 is a browser application enabling the network administrator 118 to communicate over network 190 and retrieve the status information stored in repository 380. The display manager 440 is able to retrieve uplink and downlink status information from repository 380 for each of one or more respective wireless communication links to analyze the uplink status information 370 in view of the corresponding downlink status information 270 for a respective wireless communication link 128-1. In this manner, the display manager 440 can be used to keep track of and view events and/or attributes associated with uplinks/downlinks for each respective wireless communication link.

As previously discussed, the network administrator 118 or machine-based analyzer (e.g., a computer application) can be configured to analyze the uplink status information in view of the downlink status information for each of one or more respective wireless communication links to troubleshoot communication failures between the wireless access points and the computer devices.

In addition to, or as an alternative to, utilizing the status information for troubleshooting, embodiments herein can include analyzing (via the network administrator or a computer application) the uplink status information in view of the downlink status information for each of one or more respective wireless communication links to increase an efficiency of communications between the wireless access points and the computer devices.

To this end, embodiments herein can include, based on analyses, adjusting configuration settings of the uplink for subsequent communications between the wireless access points and the computer devices. In other words, the analyzer (e.g., network administrator 118 or computer application) can adjust configuration settings information associated with any of the resources (e.g., RF interface 260, communication manager 250, RF interface 360, wireless access points 105, computer device 150, wireless access point controller 110, etc.) to fix a problem or optimize use of the wireless network and/or corresponding resources.

Figure 5:
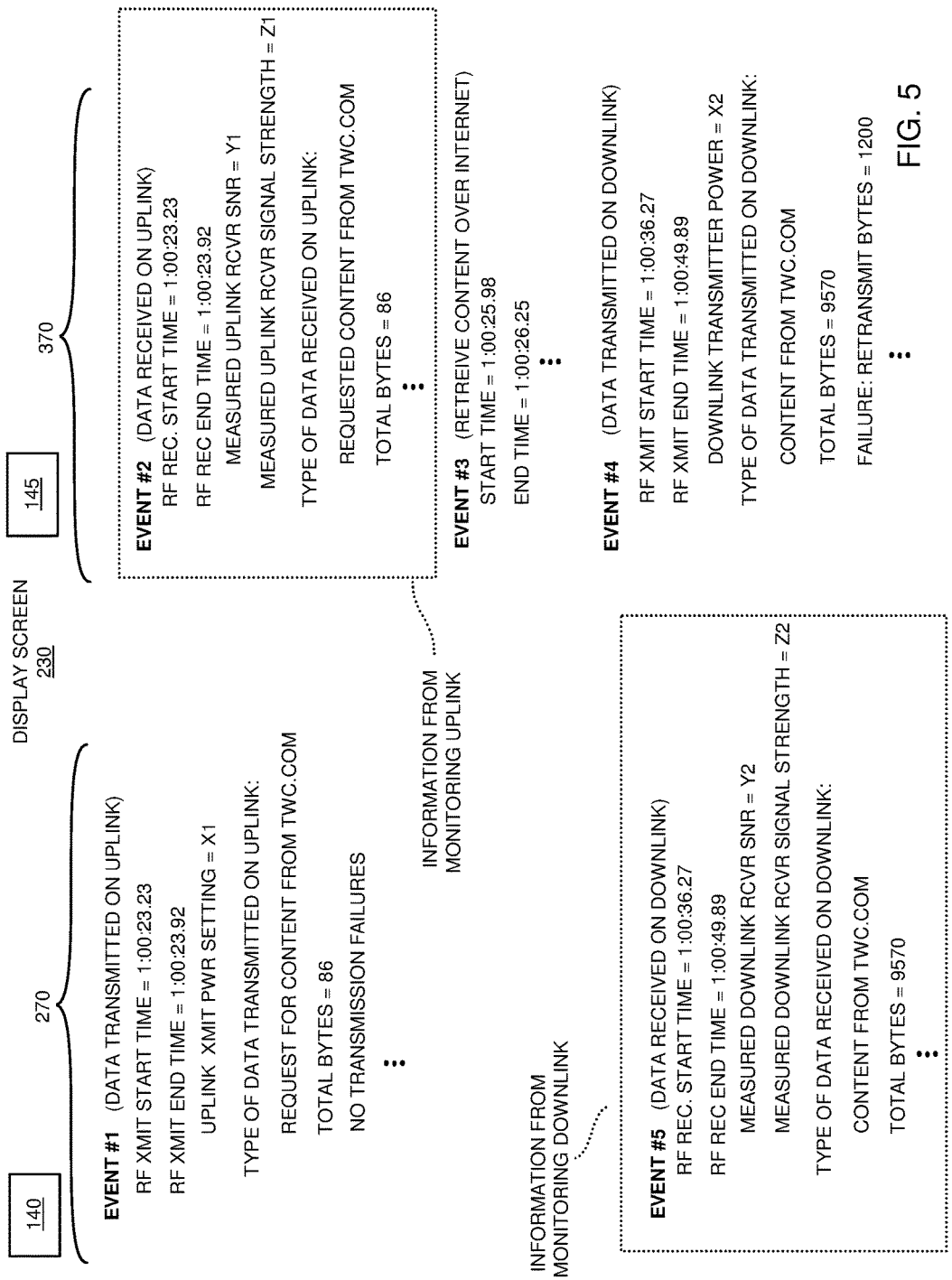
FIG. 5 is an example diagram illustrating display of uplink and downlink according to embodiments herein.

FIG. 5 is an example diagram illustrating display of collected status information and a sequence of detected events from different perspectives of a wireless communication link according to embodiments herein.

In general, the sequence of events as recorded by the collection managers 140 and 145 enables a respective analyzer (e.g., machine or human) to determine parameters in a respective wireless communication link that can be or need to be adjusted to improve efficiency of a respective wireless network.

In one embodiment, the management resource 120 initiates simultaneous display of the captured status information from each of the collection managers. The event information can be correlated and staggered such that the events are ordered from oldest to newest from the top to bottom of the display screen 230. This makes it easier for the network administrator 118 viewing the information to follow the flow of events.

As shown, assume that the collection manager 140 detects occurrence of event #1 such as transmission of a user-initiated content request (e.g., request for content from web page TWC.COM) from computer device 150-1 over the uplink 225-2. Collection manager 140 records event #1 and corresponding information such as when the data request was transmitted on the uplink 225-2 to the wireless access point 105-1. As further shown, the information recorded by the collection manager 140 for event #1 can include any suitable information such as the power setting of transmitting the request, number of bytes transmitted, etc. There were no failures transmitting the request on the uplink 225-2.

As previously discussed, collection manager 145 monitors the uplink 225-2 and generates status information 370. In this example embodiment, the collection manager 145 records information as shown for event #2. The status information for event #2 indicates the SNR and signal strength associated with the uplink 225-2 during the transmission. The start and end time information (e.g., formatted as HOURS:MINUTES:SECONDS:MILLISECONDS) indicate a duration of transmitting the 86 bytes of data over the uplink from the computer device 150-1 to the wireless access point 105-1.

The collection manager 145 records information associated with event #3 such as the start and end time of retrieving the requested content over the Internet. In this example, there is almost a 2.05 second delay between a time when the wireless access point received the request (e.g., 1:00:23.92) and a beginning time (e.g., 1:00:25.98) of retrieving the requested content over the Internet. The 2.05 second delay can indicate poor performance by the wireless access point 105-1 to retrieve the requested content after receiving the request.

For event #4, such as transmission of the retrieved content (e.g., TWC web page) over the downlink 225-1, the collection manager 145 collects and stores the information as shown. In this instance, the status information 370 indicates that the wireless access point 105-1 had to retransmit 1200 of the 9570 bytes due to a downlink transmission failure. The requirement of having to retransmit a large portion of the data on the downlink 225-1 indicates that the downlink 225-1 is not working properly or efficiently.

Additionally, based on the status information for event #4 and event #3, it can be noted that the wireless access point 105-1 initiates transmission of the retrieved content at time 1:00:36.27. This is 10.02 seconds after the wireless access point 105-1 retrieved the requested content over the Internet (event #3). This can further indicate a problem with the wireless access point 105-1 such as the inability of the wireless access point 105-1 to quickly proceed with transmitting data on the downlink 225-1 to the computer device 150-1 after the requested data has been retrieved.

Collection manager 140 monitors the downlink 225-1 and stores respective information as shown for event #5 such as the receipt of the requested content from TWC.COM over the downlink 225-1.

Based on the collected information, the analyzer is able to correct or troubleshoot issues associated with the wireless communication link 128-1. Embodiments herein can include continuous monitoring of one or more wireless communication links to ensure that the network is operating efficiently.

Note that the network administrator 118 can filter which collected data is displayed on the display screen 230. For example, if desired, the network administrator 118 can initiate display of information derived only from monitoring the uplink or downlink (e.g., events #2, #5, etc.).

Figure 6:
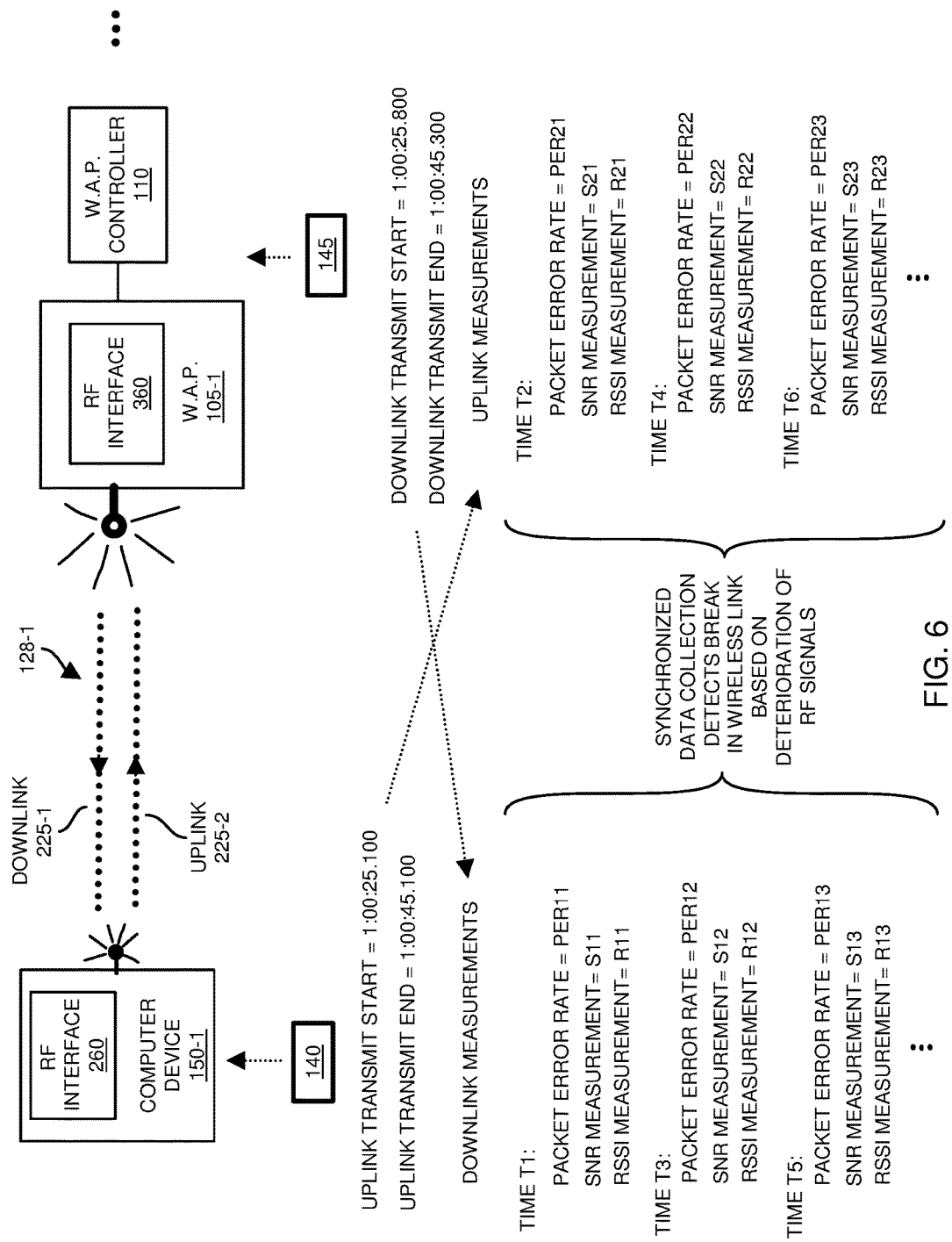
FIG. 6 is an example diagram illustrating display of collected uplink and downlink information according to embodiments herein.

FIG. 6 is an example diagram illustrating display of collected information according to embodiments herein.

As shown in this example embodiment, the RF interface 260 receives communications on the downlink 225-1 and transmits data on uplink 225-2 for approximately a twenty second window in a range of time such as between 1:00:25.100 and 1:00:45.300.

By way of a non-limiting example, in one embodiment, the uplink and downlink do not necessarily transmit data at the same time, although such embodiments are possible if desired. For example, some segments of time in this range between approximately 1:00:25.100 and 1:00:45.300 can be used to transmit respective data communications on the uplink from the computer device 150-1 to the wireless access point 105-1; some segments of time in this range can be used to transmit respective data communications on the uplink from the computer device 150-1 to the wireless access point 105-1.

Assume in this example that the wireless communication link 128-1 fails or breaks at or after approximately 1:00:45.100. During the time when the downlink 225-1 is functioning properly such as approximately between time 1:00:25.100 and 1:00:45.100, the collection manager 140 continuously monitors downlink 225-1 and records retrieved measurements for parameter information PER, SNR, RSSI, etc., at multiple sample times as shown. The collection manager 140 collects the information during segments of time when the RF interface 360 transmits data on the downlink 225-1 to the RF interface 260 of computer device 150-1.

In one embodiment, based on trending of information, and deteriorating RF transmissions as indicated by (e.g., increased packet error rates, increased SNR readings, lower RSSI readings over time), an analyzer is able to determine a health of the respective downlink 225-1.

As further shown in this example embodiment, the RF interface 360 receives communications on the uplink 225-2 in certain segments of time in approximately the time range between 1:00:25.100 and 1:00:45.300. Assume that the wireless communication link 128-1 fails or breaks at or after 1:00:45.100. During the time when the downlink 225-1 is functioning properly, the collection manager 145 continuously monitors uplink 225-2 and records retrieved measurements for parameter information PER, SNR, RSSI, etc., at multiple sample times as shown. As mentioned, the time stamp information associated with collected data are staggered in time or are offset in time because the downlink and uplink are not used at the same time. Based on trending of information, and deteriorating RF transmissions as indicated by (e.g., increased packet error rates, increased SNR readings, lower RSSI readings), an analyzer is able to determine a health of the respective uplink 225-2.

Note that in addition to parameters such as PER (Packet Error Rate), SNR, RSSI, etc., embodiments herein can include collecting location information (such as GPS information) associated with the computer device 150-1. The location information can be time-stamped based on the master clock 155.

More specifically, the computer device 150-1 can be a mobile device moved around in a vicinity of the wireless access point 105-1. The collection manager 140 can be configured to continuously monitor and store the location information (as generated by a location tracker in the computer device 150-1) as a parameter in status information 370. If needed, the collection manager 140 stamps the location information based on clock 255. In such an instance, when viewing the status information collected from both collection managers 140 and 145, it is possible to determine at what location (of computer device 1501-) an error occurs. For example, if the radio frequency parameters of the monitored uplink and downlink deteriorate over time, it may be due to the computer device 150-1 moving around in a region in a vicinity of the wireless access point 105-1 where there happens to be a dead spot.

Note that yet further embodiments herein can include a probe computer device used by a respective technician in a vicinity of the wireless access point 105-1. In one embodiment, the probe computer device includes the same components as computer device 150-1 as well as an application that is configured to establish a wireless communication link (with a nearby wireless access point such as wireless access point 105-1) and communicate with management resource 120 (e.g., a server). As its name suggests, the probe computer device can be configured to transmit test or probe signals to the management resource 120 in order to test attributes of the system.

In one embodiment, the probe computer device includes a location tracker that produces location information indicating the location of the probe computer device over time. The location tracker can be synchronized with master clock 155 as well. In the event that the probe computer device experiences a dead zone, the link between the probe computer device and the wireless access point may be severed. The probe computer device can continue to produce location information as the technician walks with the probe computer device around vicinity of the wireless access point 105-1. The collection manager in the probe computer device continues to store the location information (and potentially other parameters as discussed herein), while the probe computer device continues to try to reconnect to the wireless access point and communicate with the server. Upon eventually reconnecting with the management resource 120, the collection manager of the probe computer device uploads the collected data. Based on the location from the probe computer device received after re-establishing a connection with the wireless access point 105-1 and communicating the collected information to the management resource 120, it is possible for an analyzer associated with management resource 120 to determine radio frequency dead zones in a vicinity of the wireless access point 105-1. The radio frequency dead zones correspond to locations where the wireless access point 105-1 is unable to communicate with a respective client device.

As discussed above, radio frequency failures can occur. Note that non radio frequency type failures may occur as well. For example, the collected information associated with the uplink and downlink may indicate that the radio frequency links are healthy and working properly. A monitored condition such slow response in conveying requested content to the target computer device 150-1 may be due to a backhaul error in which the wireless access point is unable to retrieve the requested content at a desired rate and forward it to the computer device 150-1 over the downlink 225-1.

Figure 7:
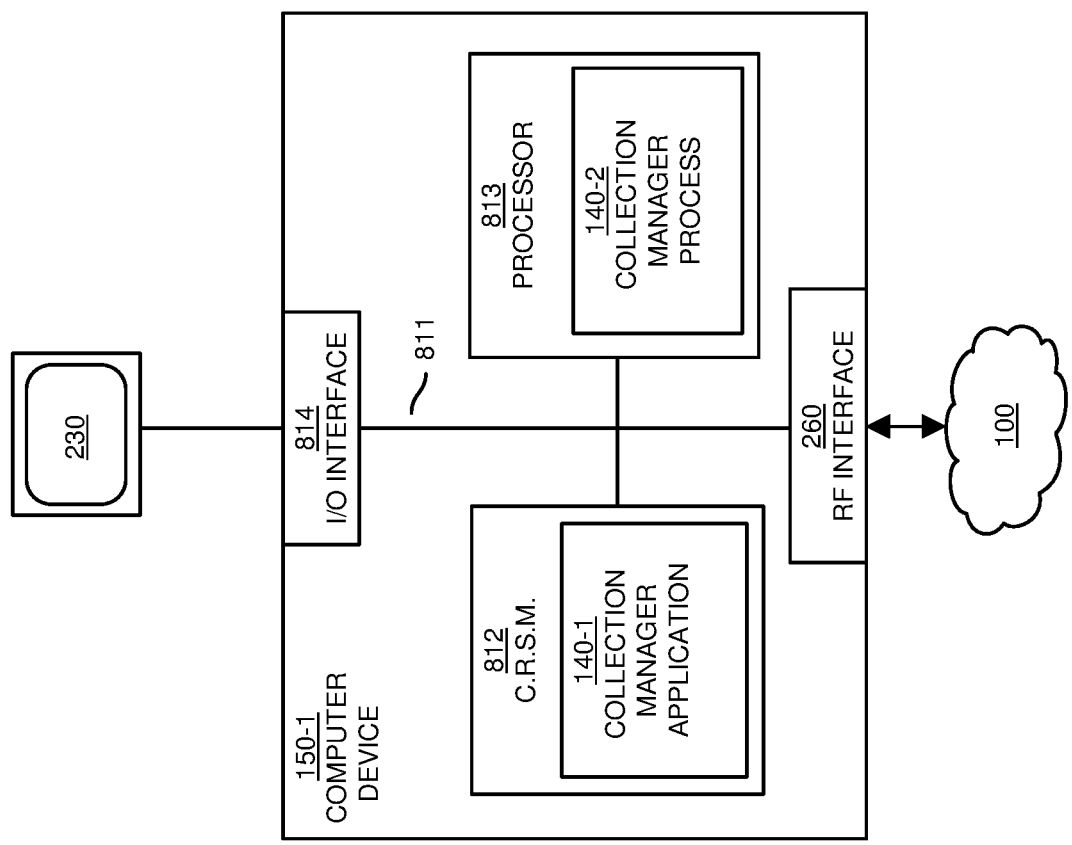
FIG. 7 is a diagram illustrating an example computer architecture in which to execute any of the functionality according to embodiments herein.

FIG. 7 is an example block diagram of a computer device for implementing any of the operations as discussed herein.

As shown, computer device 150 such as a computer system of the present example can include an interconnect 811 that couples computer readable storage media 812 such as a non-transitory type of media (i.e., any type of hardware storage medium, tangible storage medium, etc.) in which digital information can be stored and retrieved, a processor 813 (e.g., one or more processor devices or hardware processors), I/O interface 814, and a RF interface 260. RF interface 260 enables the computer device 150-1 to communicate with other network elements present in a corresponding network environment 100 such as wireless access point 105-1 as previously discussed.

I/O interface 814 provides connectivity to display screen 230 and, if present, other peripheral equipment such as a playback device, display screen, keypad, a computer mouse, etc.

Computer readable storage medium 812 can be any hardware storage resource or device such as memory, optical storage, hard drive, floppy disk, etc. In one embodiment, the computer readable storage medium 812 stores instructions and/or data.

As shown, computer readable storage media 812 is encoded with collection manager application 140-1 (e.g., software, firmware, computer code, etc.) executed by processor 813 of computer device 150-1. Collection manager application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in collection manager application 140-1 stored on computer readable storage medium 812.

Execution of the monitor resource application 140-1 produces processing functionality such as collection manager process 140-2 in processor 813. In other words, the collection manager process 140-2 associated with processor 813 represents one or more aspects of executing collection manager application 140-1 within or upon the processor 813 in the computer device 150-1.

Those skilled in the art will understand that the computer device 150-1 can include other processes and/or software and hardware components, such as an operating system that controls allocation and use of hardware resources to execute collection manager application 140-1.

In accordance with different embodiments, note that computer device 150-1 may be any of various types of devices, including, but not limited to, a mobile computer, a personal computer system, a server resource, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

A similar architecture to the architecture of computer device 150-1 can be used to execute the collection manager 145 as well as any other resources as discussed herein. In one embodiment, the management resource 120 can be a server including a computer readable storage medium and corresponding processor. The computer readable storage medium can be used to store instructions associated with collection manager 145. A respective processor executes the instructions in the computer readable storage medium to carry out functionality as discussed herein.

Functionality supported by the different resources will now be discussed via flowcharts in FIGS. 8-10. Note that the steps in the flowcharts below can be executed in any suitable order.

Figure 8:
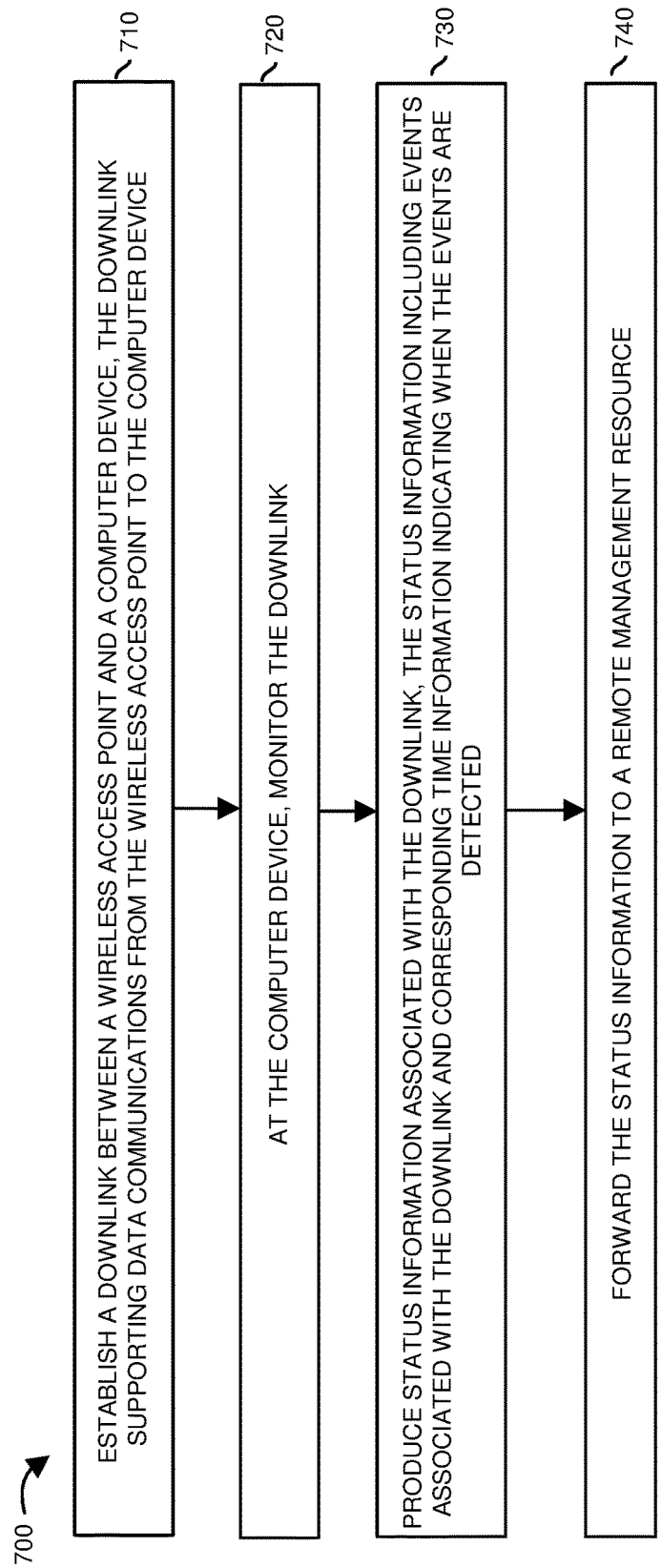
FIG. 8 is an example diagram illustrating a method of collecting status information associated with a downlink according to embodiments herein.

FIG. 8 is a flowchart 700 illustrating an example method according to embodiments. Note that there will be some overlap with respect to concepts as discussed above.

In processing block 710, the computer device 150-1 establishes a downlink between a wireless access point and a computer device, the downlink supporting data communications from the wireless access point to the computer device above.

In processing block 720, the collection manager 140 in computer device 150-1 monitors the downlink 225-1.

In processing block 730, the collection manager 140 produces status information 270 associated with at least the downlink 225-1. In one embodiment, the status information 270 including events (which may include detected attributes such as setting of the downlink 225-1) associated with the downlink 225-1 and corresponding time information indicating when the events are detected.

The collection manager 140 forwards the status information to a remote management resource 120.

Figure 9:
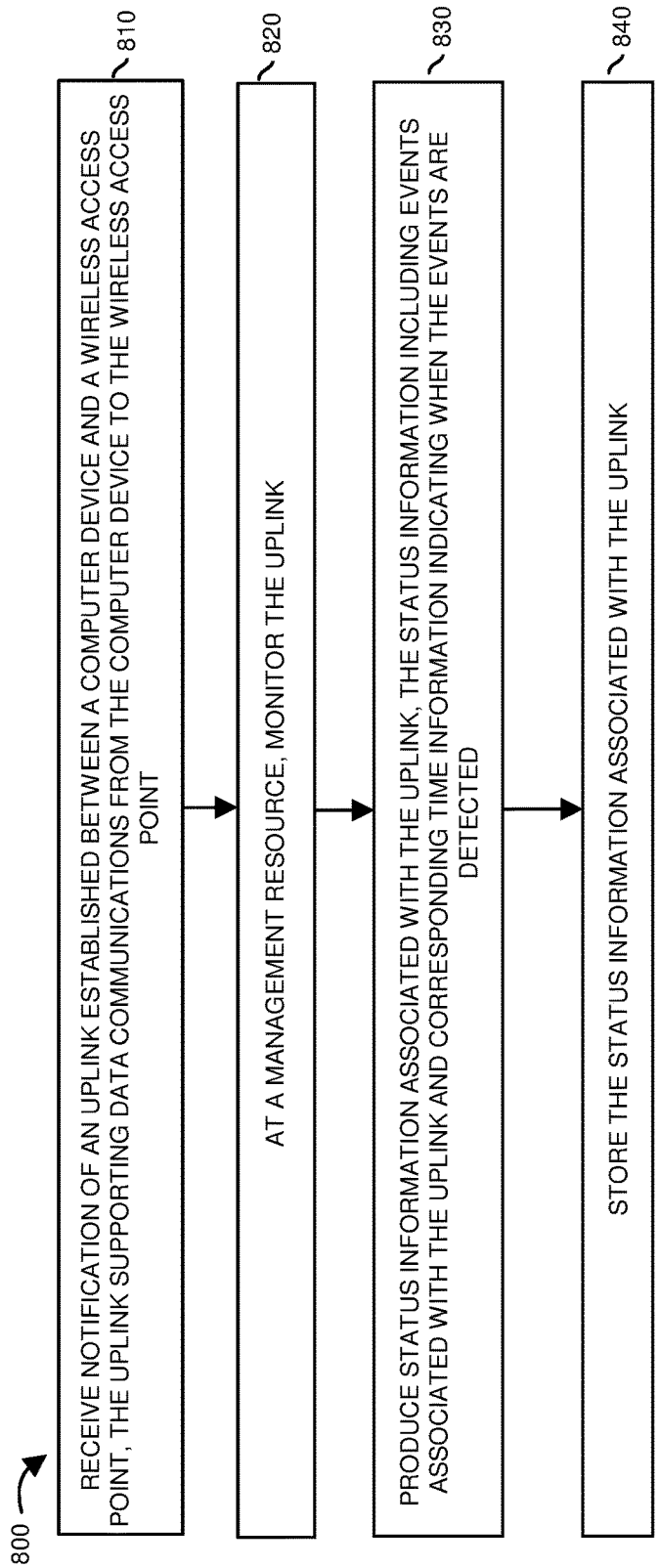
FIG. 9 is an example diagram illustrating a method of collecting status information associated with an uplink according to embodiments herein.

FIG. 9 is a flowchart 800 illustrating an example method according to embodiments. Note that there will be some overlap with respect to concepts as discussed above.

In processing block 810, the management resource 120 receives notification of an uplink 225-2 established between a computer device 150-1 and a respective wireless access point 105-1. The uplink 225-2 supports data communications from the computer device 150-1 to the wireless access point 105-1.

In processing block 820, via collection manager 145, the management resource 120 monitors the uplink 225-2.

In processing block 830, the collection manager 145 of management resource 120 produces status information 370 associated with the uplink 370. The status information includes events (which may include detected attributes of the downlink 225-1) associated with the uplink 225-2 and corresponding time information indicating when the events are detected.

In processing block 840, the collection manager 145 stores the status information 370 associated with the uplink 225-2.

Figure 10:
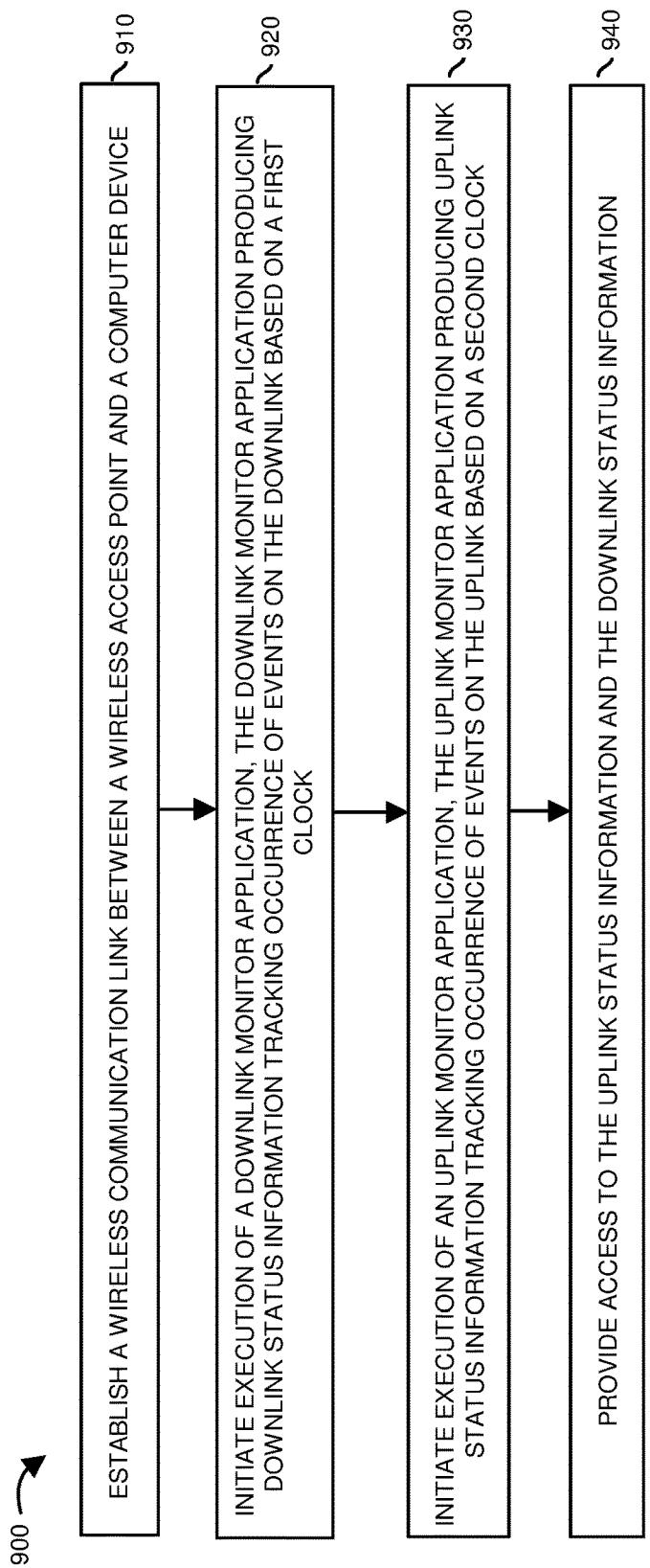
FIG. 10 is an example diagram illustrating a method of providing access to and analysis of collected status information associated with an uplink and downlink according to embodiments herein.

FIG. 10 is a flowchart 900 illustrating an example method according to embodiments. Note that there will be some overlap with respect to concepts as discussed above.

In processing block 910, a service provider establishes a wireless communication link 128-1 between a wireless access point 105-1 and a computer device 150-1.

In processing block 920, a service provider (providing wireless services in network environment 100) initiates execution of a downlink monitor application (such as collection manager 140). The downlink monitor application produces at least downlink status information tracking occurrence of events on the downlink 225-1 based on a first clock such as clock 255.

In processing block 930, the service provider initiates execution of an uplink monitor application (such as collection manager 145). The uplink monitor application producing at least uplink status information tracking occurrence of events on the uplink based on a second clock 355.

In processing block 940, service provider provides access to the collected uplink status information and the collected downlink status information.

Note again that techniques herein are well suited for use in wireless networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of analyzing a wireless communication link between a wireless access point and a communication device, the method comprising:
producing first downlink status information associated with transmission of communications from the wireless access point to the communication device over a downlink of the wireless communication link, the first downlink status information indicating attributes of transmitting the communications over the downlink from the wireless access point to the communication device;

monitoring receipt of the communications at the communication device;

producing second downlink status information associated with receiving the communications at the communication device over the downlink, the second downlink status information indicating attributes of receiving the communications at the communication device; and analyzing the first downlink status information in view of the second downlink status information.

2. The method as in claim 1, wherein the communications include content requested by the communication device;

wherein producing the first downlink status information includes, at the wireless access point, monitoring transmission of the content over the downlink, the first downlink status information indicating attributes of transmitting the requested content over the downlink from the wireless access point to the communication device;

wherein monitoring receipt of the communications at the communication device includes: monitoring receipt of the requested content over the downlink at the communication device; and wherein producing the second downlink status information includes producing the second downlink status information to indicate attributes of receiving the requested content at the communication device.

3. The method as in claim 2, wherein the first downlink status information indicates a power setting at which the content is transmitted on the downlink from the wireless access point to the communication device; and wherein the second downlink status information indicates a wireless signal strength at which the content is received on the downlink at the communication device.

4. The method as in claim 3, wherein analyzing the first downlink status information in view of the second downlink status information includes:

on a display screen, simultaneously displaying i) the power setting at which the content is transmitted from the wireless access point, and ii) the wireless signal strength at which the the content is received at the communication device.

5. The method as in claim 1, wherein producing the first downlink status information includes: producing the first downlink status information to indicate link attributes of the downlink and a first time value indicating a respective time at which a first communication is transmitted on the downlink from the wireless access point to the communication device; and wherein producing the second downlink status information includes: producing the second downlink status information to indicate link attributes of the downlink and a second time value indicating a respective time at which the first communication is received over the downlink at the communication device.

6. The method as in claim 1, wherein producing the first downlink status information includes: producing the first downlink status information to indicate error information associated with transmitting the communications over the downlink from the wireless access point to the communication device; and wherein producing the second downlink status information includes: producing the second downlink status information to indicate error information associated with receiving the communications over the downlink at the communication device.

7. The method as in claim 1, wherein producing the first downlink status information includes:

producing the first downlink status information to include a numerical value indicating an amount of data that was retransmitted from the wireless access point due to a transmission failure.

8. The method as in claim 7 further comprising:

displaying the first downlink status information, the displayed first downlink status information indicating the amount of data that was retransmitted over the downlink due to the failure.

9. The method as in claim 1, wherein the second downlink status information is transmitted over an uplink of the wireless communication link from the communication device to the wireless access point.

10. The method as in claim 1, wherein producing the first downlink status information includes producing the first downlink status information to indicate when the communications are transmitted from the wireless access point to the communication device; and wherein producing the second downlink status information includes producing the second downlink status information to indicate when the communications are received at the communication device.

11. The method as in claim 1, wherein the first downlink status information indicates a power setting at which the communications are transmitted on the downlink from the wireless access point to the communication device; and wherein the second downlink status information indicates a wireless signal strength at which the communications are received on the downlink at the communication device.

12. The method as in claim 1, wherein analyzing the first downlink status information in view of the second downlink status information includes:

on a display screen, simultaneously displaying i) a power setting at which the communications are transmitted from the wireless access point, and ii) a wireless signal strength of receiving the communications at the communication device.

13. The method as in claim 1 further comprising:

simultaneously displaying the first downlink status information and the second downlink status information on a display screen.

14. The method as in claim 1, wherein the first downlink status information indicates wireless link quality attributes from a first perspective in which the wireless access point transmits the communications over the downlink from the wireless access point; and wherein the second downlink status information indicates wireless link quality attributes from a second perspective in which the communication device receives the communications over the downlink from the wireless access point.

15. The method as in claim 1, wherein producing the first downlink status information includes: producing the first downlink status information to indicate a source of the communications; and wherein producing the second downlink status information includes: producing the second downlink status information to indicate the source from of the communications.

16. The method as in claim 1, wherein producing the first downlink status information includes producing the first downlink status information to include a transmit time range indicating a time window in which the communications are transmitted from the wireless access point to the communication device; and wherein producing the second downlink status information includes producing the second downlink status information to include a receive time range indicating a time window in which the communications are received at the communication device.

17. The method as in claim 16, wherein the transmit time range specifies a transmit start time value and a transmit end time value, the communications transmitted from the wireless access point between the transmit start time value and the transmit end time value of the transmit time range; and wherein the receive time range specifies a receive start time value and a receive end time value, the communications received from the wireless access point between the receive start time value and the receive end time value of the receive time range.

18. A system comprising:

a wireless access point;

a wireless communication link extending between the wireless access point and a communication device;

first monitor hardware to produce first downlink status information associated with transmission of communications from the wireless access point over a downlink of the wireless communication link to the communication device;

second monitor hardware to monitor receipt of the communications at the communication device over the downlink and produce second downlink status information associated with receiving the communications at the communication device; and a computer analyzer to analyze the first downlink status information in view of the second downlink status information.

19. The system as in claim 18, wherein the communications include content requested by the communication device;

wherein the first monitor hardware, which is disposed at the wireless access point, monitors transmission of the content over the downlink, the first downlink status information indicating attributes of transmitting the content over the downlink from the wireless access point to the communication device; and wherein the second monitor hardware, which is disposed at the communication device, monitors receipt of the content over the downlink at the communication device and produce the second downlink status information to indicate attributes of receiving the content at the communication device.

20. The system as in claim 19, wherein the first downlink status information indicates a power setting at which the content is transmitted on the downlink from the wireless access point to the communication device; and wherein the second downlink status information indicates a wireless signal strength at which the content is received on the downlink at the communication device.

21. The system as in claim 20 further comprising:

a display screen to simultaneously display i) the power setting at which the content is transmitted from the wireless access point, and ii) the wireless signal strength at which the content is received at the communication device.

22. The system as in claim 18, wherein the first monitor hardware produces the first downlink status information to indicate link attributes of the downlink and a first time value indicating a respective time at which a first communication is transmitted on the downlink from the wireless access point to the communication device; and wherein the second monitor hardware produces the second downlink status information to indicate link attributes of the downlink and a second time value indicating a respective time at which the first communication is received on the downlink at the communication device.

23. The system as in claim 18, wherein the first monitor hardware produces the first downlink status information to indicate error information associated with transmitting the communications over the downlink from the wireless access point to the communication device;

wherein the second monitor hardware produces the second downlink status information to indicate error information associated with receiving the communications over the downlink at the communication device; and wherein the first monitor hardware produces the first downlink status information to include a numerical value indicating an amount of data that was retransmitted from the wireless access point due to a transmission failure.

24. The system as in claim 18, wherein the first downlink status information indicates power setting information at which the communications are transmitted on the downlink from the wireless access point to the communication device; and wherein the second downlink status information indicates a wireless signal strength at which the communications are received over the downlink at the communication device.

25. The system as in claim 18 further comprising:

a display screen operable to simultaneously display i) a power setting at which the communications are transmitted from the wireless access point over the downlink, and ii) a wireless signal strength of receiving the communications over the downlink at the communication device.

26. Computer-readable hardware storage having instructions stored thereon, the instructions, when carried out by computer processor hardware, cause the computer processor hardware to:

produce first downlink status information associated with transmission of communications from a wireless access point to a communication device over a downlink of a wireless communication link, the first downlink status information indicating attributes of transmitting the communications over the downlink from the wireless access point to the communication device;

based on monitoring receipt of the communications at the communication device, producing second downlink status information indicating attributes of receiving the communications over the downlink at the communication device; and analyze the first downlink status information in view of the second downlink status information.

\* \* \* \* \*